United States Patent [19]
Horst

Patent Number: 5,419,621
Date of Patent: May 30, 1995

[54] BRAKING SYSTEM

[75] Inventor: Eckert Horst, Rehburg-Loccum, Germany

[73] Assignee: WABCO Standard GmbH, Hanover, Germany

[21] Appl. No.: 168,031

[22] Filed: Dec. 15, 1993

[30] Foreign Application Priority Data

Dec. 18, 1992 [DE] Germany ............ 42 42 887.4

[51] Int. Cl.⁶ .................. B60T 8/88; B60T 13/66
[52] U.S. Cl. .................... 303/15; 303/6.01; 303/100; 303/20
[58] Field of Search .............. 303/15, 2–3, 303/50–56, 100, 7, 113.4, 93, 111, 20, 6.01, DIG. 1, DIG. 2, DIG. 3, DIG. 4, 9.62, 9.69; 188/156, 158

[56] References Cited

U.S. PATENT DOCUMENTS

| 4,749,238 | 6/1988 | Singleton et al. |
| 5,145,239 | 9/1992 | Meise et al. ............... 303/15 |
| 5,251,966 | 10/1993 | Friederichs et al. ........ 303/15 |
| 5,294,190 | 3/1994 | Feldmann et al. .......... 303/15 |
| 5,338,106 | 8/1994 | Ruthen et al. ........... 303/100 X |

FOREIGN PATENT DOCUMENTS

| 0183089 | 6/1986 | European Pat. Off. |
| 0378564 | 12/1991 | European Pat. Off. |
| 0512226 | 11/1992 | European Pat. Off. |
| 3038797 | 5/1982 | Germany . |
| 3237921 | 4/1984 | Germany . |
| 3502825 | 7/1986 | Germany . |
| 3705333 | 8/1987 | Germany . |
| 3841750 | 6/1990 | Germany . |
| 4112845 | 10/1992 | Germany . |
| 622744 | 4/1981 | Switzerland . |
| 1412183 | 10/1975 | United Kingdom . |
| 2093938 | 9/1982 | United Kingdom . |

Primary Examiner—Douglas C. Butler
Attorney, Agent, or Firm—Meltzer, Lippe, Goldstein, Wolf, Schlissel & Sazer

[57] ABSTRACT

A braking system comprises at least one brake, a brake value demand mechanism which emits an operator signal when actuated by an operator, and an energy dimensioning device which supplies braking energy to the brake to actuate it, thereby producing a braking value at the brake. The braking system also includes a control unit which receives the operator signal from the brake value demand mechanism and emits a braking value signal based thereon. The energy dimensioning device receives the braking value signal and supplies to the brake the braking energy needed to produce the desired braking value at the brake. In order to eliminate hysteresis in the braking system, the control unit supplies to the energy dimensioning device a braking value signal taken from a first characteristic line of braking value as a function of braking value signal when the brake is actuated. When the brake is released, the control unit supplies to the energy dimensioning device a braking value signal taken from a second characteristic line of braking value as a function of braking value signal.

27 Claims, 3 Drawing Sheets

BRAKING SYSTEM

BACKGROUND OF THE INVENTION

The invention relates to a braking system having at least one brake actuated by the delivery of braking energy wherein the effect of hysteresis of the brake when changing from brake actuation to brake release is eliminated or greatly reduced.

A braking system is known from DE 35 02 825 A1 wherein the operator sets an operator signal by actuating a braking value demand mechanism (e.g., a brake pedal) and thereby informs the braking system of his braking value requirement. The relationship between braking value and operator signal can be represented as a desired-value characteristic line in a characteristic diagram wherein the braking value (B) and the operator signal (S) are the coordinates. FIG. 1 shows such a characteristic diagram schematically with the desired-value characteristic line (T) as a solid line. The desired-value characteristic line (T) is equal to zero only when the operator signal (S) is equal to a certain operator signal value SA because of unavoidable response resistances of the brake. In this braking system, the braking value (B) is a parameter which depends on the braking force produced by the brake. The braking value (B) is the braking force itself, when it deepends exclusively on the braking force. However, in most cases the braking value (B) is a parameter which is determined by parameters of the braked object in addition to the braking force. In the field of automotive technology, the braking force between wheel and road surface and the vehicle deceleration are frequently used as the braking value. Thus, the dimensions of the vehicle or of vehicle parts, or the vehicle weight, contribute to the braking value. In the known braking system of the above-mentioned DE 35 02 825 A1, the vehicle deceleration, the braking force between wheel and road surface, and the utilization of the frictional interaction between wheel and road surface are designated as the braking force. A control unit transmits a braking value signal to an energy dimensioning device upon receiving an operator signal, whereupon the energy dimensioning device supplies braking energy to the brake as a function of the magnitude of the braking value signal, but often also as a function of additional signals as well. The brake then delivers a braking force which corresponds to the delivered braking energy. In the known braking system, the control unit always dimensions the braking value signal so as to be equal or proportional to the operator signal.

Due to hysteresis, the brake's characteristic lines for the delivered braking force (K) follow different courses as a function of the braking energy (Z) for brake actuation and for brake release. This is shown in the schematic braking force/braking energy diagram according to FIG. 3. When the brake is actuated, i.e., as the supply of braking energy (Z) rises or remains unchanged, the braking force (K) follows characteristic line (X), starting from a braking force value ZA which is required to overcome the brake response resistances. When the brake is released, i.e., as braking energy (Z) drops, the braking force (K) follows the course of characteristic line (Y). Due to brake response resistances, the braking force (K) becomes equal to zero only in the presence of a residual braking energy ZR. For purposes of analysis, it shall be assumed that the brake is actuated up to a point with the coordinates of braking energy Z1 and braking force K1. If the braking energy (Z) is now decreased in order to release the brake, this does not have any effect upon the braking force K1 until the braking energy (Z) overcomes the difference in characteristic lines at a value Z2 and reaches characteristic line (Y) for brake release. Only as the braking energy (Z) continues to drop below Z2 does the braking force (K) decrease according to characteristic line(Y) for brake release. The characteristic line difference mentioned here is the hysteresis associated with point Z1/K1, and the surface between the characteristic lines (X) and (Y) is the hysteresis field.

This property of the brake affects the braking system also in the sense that the braking value (B) produced by the braking system, as a function of the braking value signal (aS) follows different characteristic lines for brake actuation and for brake release. This is shown in FIG. 2 through the corresponding characteristic lines (V) and (W). In FIG. 2 the characteristic line difference or surface between the characteristic lines (V, W) represents the hysteresis or the hysteresis field of the braking system. Similarly to FIG. 3, the braking value signal values aSA and aSR represent starting and finishing points of the characteristic lines (V, W) resulting from brake response resistances and the residual energy required to overcome the former. For example, if the braking system is actuated up to a point with the coordinate braking value signal aS1 and braking value B1, and the braking value signal (aS) is then decreased, the characteristic line difference or hysteresis associated with point aS1/B1 must be overcome before the braking system responds to the decrease in braking value signal (aS) and lowers the braking value (B). Because of the previously-mentioned permanent maintenance of equality or proportionality between between opertor signal(S) and braking value signal (aS), the just described behavior of the known braking system in dependency on the braking value signal (aS) means an identical or similar behavior in dependency on the operator signal (S). In other words: For brake release, the operator signal (S) must first drop by a value dependent on the hysteresis before the braking system responds with a braking value drop. The "reactionless drop" of the operator signal (S) which is required to overcome the hysteresis and thereby to obtain a reaction of the known braking system is also accompanied by a delayed response when the brake is released.

SUMMARY OF THE INVENTION

It is the object of the instant invention to improve a braking system of the type mentioned initially by simple means in such manner that the response delay in a brake release is at least decreased.

This is achieved in the inventive braking system which comprises at least one actuable and releasable brake, a braking value demand mechanism which emits an operator signal when activated by an operator, a control unit which receives the operator signal from the braking value demand mechanism and emits a braking value signal which depends on the operator signal, and an energy dimensioning device which receives the braking value signal and supplies braking energy based thereon to actuate the brake and thereby produce a brake force at the brake, the braking system producing a braking value which is at least co-determined by the braking force. Due to brake-hysteresis, the braking system follows a first characteristic line of braking value as a function of the braking value signal when the brake is actuated, and a second characteristic line or braking value as a function of the braking value signal when the brake is released. The control unit supplies a braking value signal taken from the first characteristic line when the operator signal is rising, and a braking value signal taken from the second characteristic line when the operator signal is dropping. In this way, the braking system is caused to follow a desired value characteristic line of the braking value as a function of the operator signal with a response delay due to brake hystersis either eliminated or greatly reduced.

Since the braking value/braking value signal characteristic line for brake release (W) is steeper than the characteristic line for brake actuation (V), it is more difficult to actuate the known braking system gradually by the operator during brake release than during brake actuation. The invention eliminates this disadvantage.

The response delay and the poorer graduable actuation during brake release in the known braking system often result, in practice, in the operator decreasing the operator signal (S), and thereby the braking value signal (aS), excessively and consequently achieving an undesirable, lower braking value (B). If the operator wishes to achieve, nevertheless, the braking value (B) which he had actually desired, he will then increase the operator signal (S) and therewith the braking value signal (aS) with the known braking system to such an extent that the braking value signal first skips the hysteresis up to the characteristic line for brake actuation, and then determines the actually demanded braking value. The skipping of the hysteresis under these circumstances results in a response delay in the re-actuation or retro-actuation of the known braking system as well as in increased consumption of braking energy. These disadvantages are reduced or even avoided entirely in a further development of the invention.

Since it is difficult for the operator of the known braking system to evaluate and adjust the operator signals and therewith the braking value signals according to his braking value demands during brake release and during re-actuation or retro-actuation, a sensitive actuation of the known braking system is generally difficult. In this respect too, the invention provides an improvement in a further development of the invention.

Additionally, the operator receives a subjective impression that the known braking system is inert and tough. This impression is improved by a further development of the invention.

The invention is applicable with all kinds of braking energy and to all technical areas in which the problems mentioned above and discussed below occur. Braking systems in automotive technology where the pressure of a hydraulic and/or pneumatic pressure fluid is used as the braking energy are important areas of application for the invention, with air generally being used as the pneumatic pressure fluid.

BRIEF DESCRIPTION OF THE DRAWINGS

Additional advantages of the invention will be apparent from the following explanation of the invention with reference to the drawings, wherein.

DETAILED DESCRIPTION OF PREFERRED EMBODIMENTS OF THE INVENTION

Figure 4:
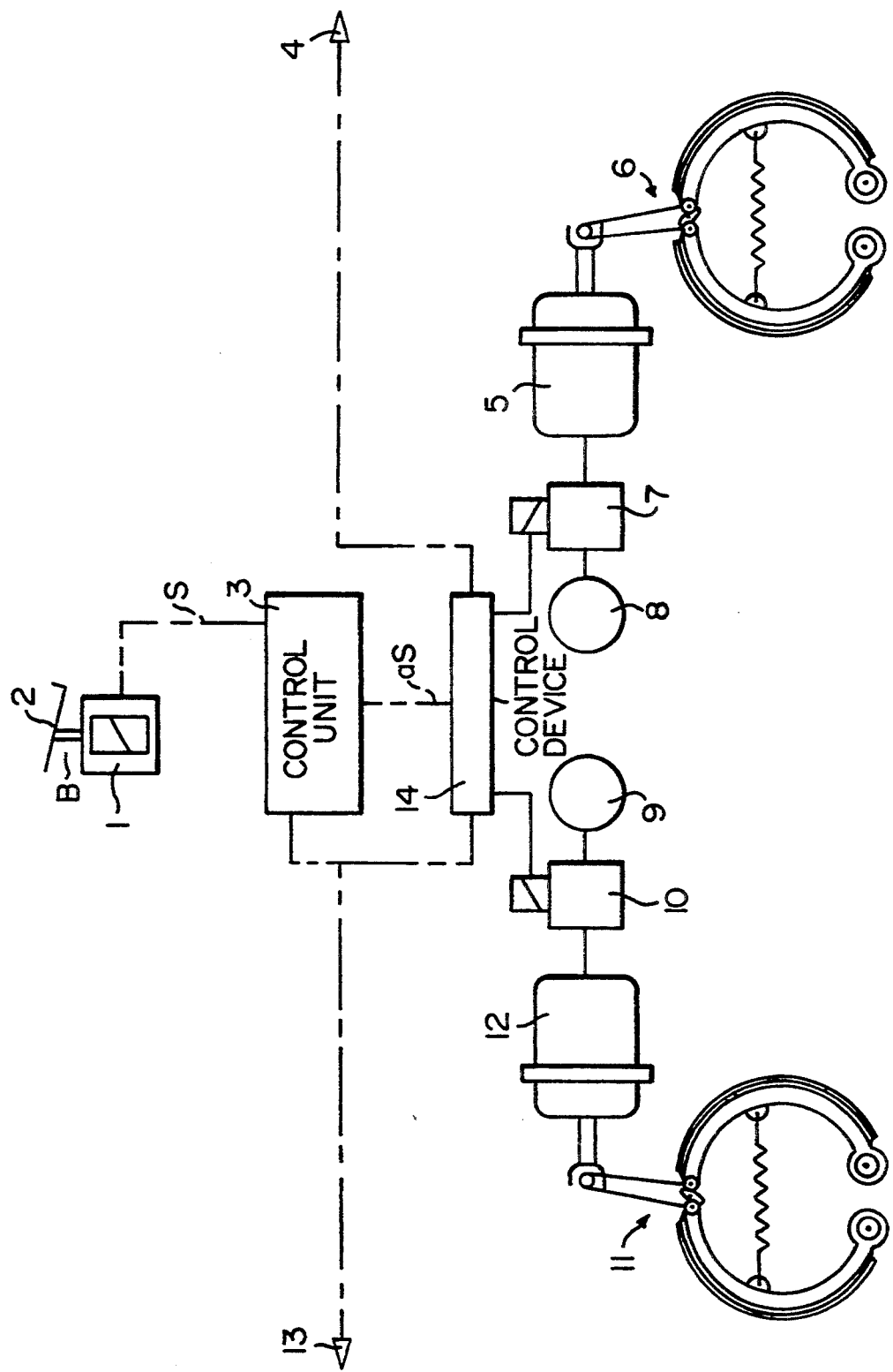
FIG. 4 shows schematically a braking system according to the invention.

In a basic design, the braking system shown in FIG. 4 is equipped with a brake (11, 12) actuated by the supply of braking energy from an energy reserve (9). As is usual, the brake (11, 12) comprises a braking apparatus (11) and a braking device (12) which receives braking energy and converts it into actuation force for the braking apparatus (11), as well as appertaining transmission elements which are not designated in detail.

The brake (11, 12) is preceded by an energy dimensioning device (10, 14) which determines the level of braking energy supplied to the brake (11, 12), or, more precisely, to the braking device (12). The energy dimensioning device (10, 14) comprises an electronic control device (14) and an electrically controlled energy distributor (10). The energy distributor (10) is connected to the control device (14) and is controlled via an energy signal which the control device (14) produces. The energy distributor (10) is constructed in a known manner-and is connected on one side to the energy reserve (9) and on the other side to the braking device (12). Additionally, the energy distributor (10) is connected to an energy relief device in a known manner not shown here. In accordance with the energy signal received from control device (14), the energy distributor (10) connects the braking device (12) to the energy reserve (9) or to the energy relief device, or maintains the braking energy supplied to the braking device (12).

The braking system is furthermore equipped with an operator-actuated electrical braking value demand mechanism (1) and with control unit (3). Control unit (3) is connected on one side to the braking value demand mechanism (1), and to the control device (14) on the other side. All the electronic components required to carry out the functions described below are contained and programmed in the control unit (3) and in the control device (14). The control unit (3) and the control device (14) can be assembled in a known manner into a single unit, or may comprise separate units.

The operator demands a braking value (B) of a given magnitude from the braking system by applying an actuator force to the actuator (2), and/or by moving the actuator (2) a certain travel, the actuator (2) being represented in FIG. 4 as a pedal or hand lever. The braking value demand mechanism (1) then transmits an operator signal (S) corresponding to the demanded braking value to the control unit (3). To obtain a subsequent partial or complete brake release, the operator reduces the actuator force and/or the actuator travel, whereupon the braking value demand mechanism (1) reduces the operator signal (S) accordingly. The operator senses an optimal condition if the braking value (B) produced by the braking system behaves as a function of the operator signal (S) according to the characteristic line (T) in FIG. 1 during brake actuation as well as during brake release.

Figure 1:
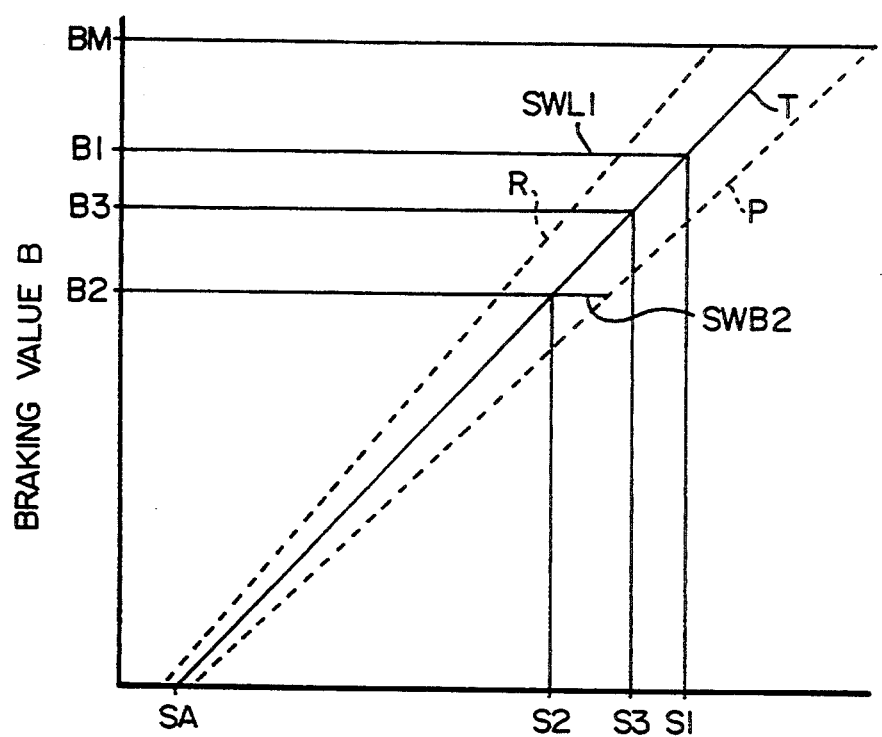
FIG. 1 shows a schematic diagram with a desired-value characteristic line (T) of a braking system.
Figure 2:
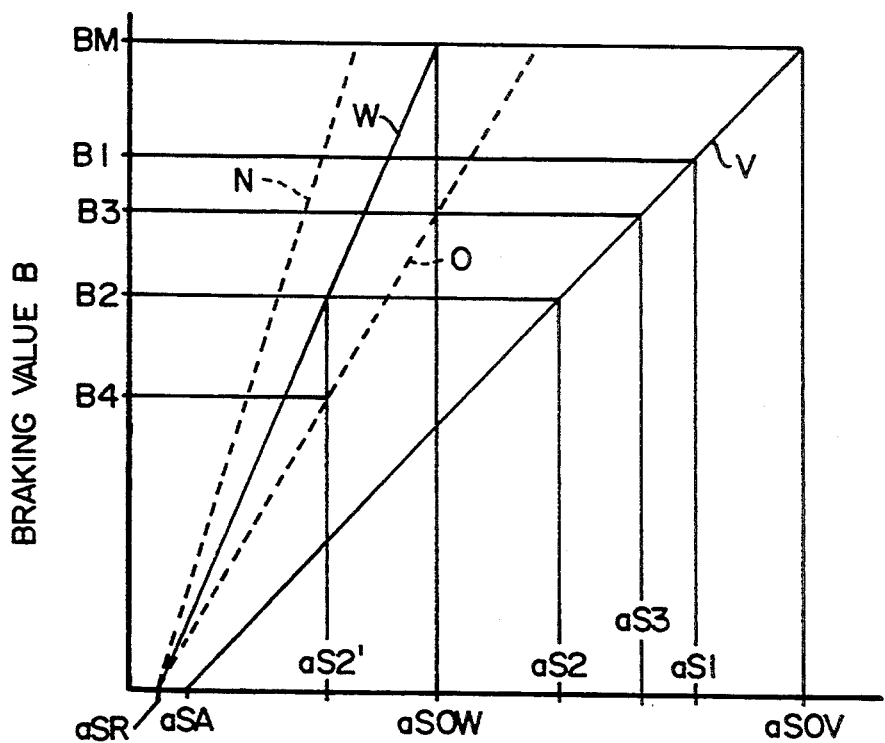
FIG. 2 shows a schematic diagram with actual-value characteristic lines (V, W) of the braking system.
Figure 3:
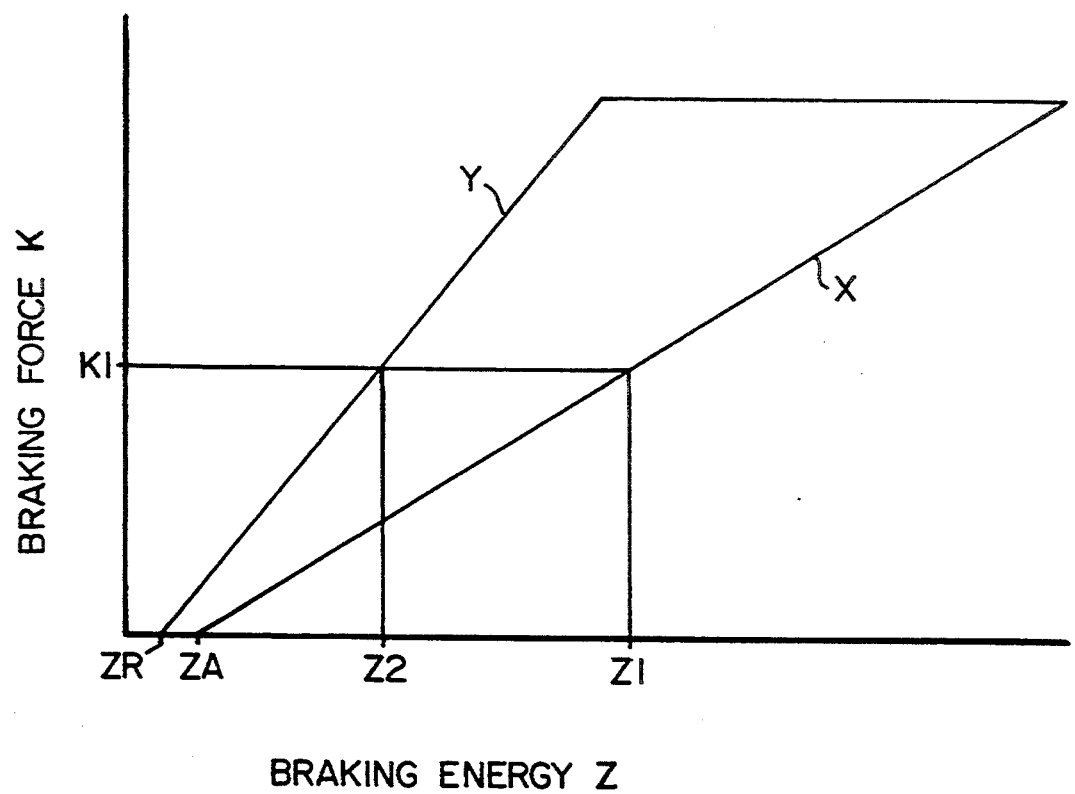
FIG. 3 shows a schematic diagram of the braking force as a function of the braking energy for brake actuation and for brake release.

The desired-value characteristic line (T) according to FIG. 1 and the characteristic line (V) for brake actuation according to FIG. 2 are stored in a memory portion of the control unit (3).

When it receives an operator signal (S), the control unit (3) transmits a braking value signal (aS) to the control device (14). The latter then transmits a corresponding energy signal to the energy distributor (10) which then allows to pass as much braking energy from the energy reserve (9) to the braking device (12), or from the braking device (12) to the energy relief device, or holds as much braking energy in the braking device (12), as is required to produce the demanded braking value (B). Depending on special design, the energy dimensioning device (10, 14) may be a control circuit or a regulating circuit for braking value (B), the energy dimensioning device (10, 14) including a braking value sensor (13) in the latter case as is indicated schematically.

The course followed by the braking value (B) as a function of the braking value signal (aS) is shown (as explained earlier) in FIG. 2. When the brake is actuated, the braking value signal (aS) transmitted to control device (14) by-control unit (3) may be the straight-through operator signal (S), or a signal equal or proportional to same, depending on the design of the control unit (3). This is indicated by the designation "aS" for the braking value signal, where "a" is understood to be a proportionality factor which may or may not be equal to 1.

Let it be assumed that the operator has actuated the braking value demand mechanism (1) at first with an operator signal value S1 corresponding to a first braking value signal value aS1 according to FIG. 2 and demanding a first braking value B1. The operator then wishes to release the braking system slightly, returning for that purpose the operator signal (S) to a second operator signal value S2 and thereby demanding a second braking value B2 corresponding to same. In this case, the control unit (3) does not adjust the braking value signal (aS) to the value aS2 which corresponds to the second operator signal value S2 according to characteristic line (V) of FIG. 2, but to a second braking value signal value aS2' to which the second braking value B2 corresponds according to characteristic line (W) for brake release shown in FIG. 2. The control unit (3) thus sets the second braking value signal value aS2', on the basis of which the energy dimensioning device (10, 14) emits braking energy needed to produce the demanded lower second braking value B2 directly while skipping the hysteresis.

In this manner of operation, the control unit (3) causes the braking system to behave according to the desired-value characteristic line (T) in FIG. 1. This produces in the operator the impression of a hysteresis-free brake, as he detects an immediate and responsive reaction of the braking system when he releases the brake.

Details of the steps carried out within the control unit (3) shall now be discussed on the basis of FIGS. 1 and 2. The equation (I):

$$aS2' = aS2 - [aSA - aSR + (aSOV - aSOW - aSA + aSR) \bullet (aS2 - aSA)/(aSOV - aSA)] \quad (I)$$

is also stored in the control unit (3). In equation (I), aSOV and aSOW represent the braking value signals of characteristic lines (V, W) corresponding to the maximum braking energy available in the energy reserve (9) for brake actuation and brake release. The braking value signals aSA and aSR represent the starting point and the end point respectively of the characteristic lines (V, W). The equation (I) determines the second braking value signal value aS2' to which the same braking value B2 is associated according to characteristic line (W) for brake release, as the characteristic line (V) for brake actuation associates with the braking value signal value aS2.

The second braking value signal value aS2' is equal to the braking value signal aS2 less its associated hysteresis. The expression in brackets on the right side of the equation (I) represents this hysteresis. The equation (I) is derived from the formula B=f(aS) for the two characteristic lines (V, W).

The control unit (3) is switched on and off through the supply or disappearance of an operator signal (S). When the control unit (3) is turned on, it interrogates the operator signal (S) by means of an installed microprocessor at a given cycle frequency. If the control unit (3) only ascertains rising or equal operator signal values from cycle to cycle after being turned on, it uses the operator signal (S) as the braking value signal (aS), or calculates the braking value signal (aS) from the operator signal (S), and delivers it to control device (14). If, however, the control unit (3) ascertains a drop in the operator signal (S) from the previous operator signal value S1 to a lower, second operator signal value S2 from one cycle to the next, it computes the appertaining braking value signal aS2 according to characteristic line (V) for brake actuation, computes from the latter the second braking value signal aS2' according to the equation (I), and transmits aS2' to the control device (14). This sequence is repeated by the control unit (3) so long as it ascertains a drop of the operator signal (S) from one cycle to the next. If, however, it no longer ascertains a drop of the operator signal (S) from one cycle to the next, it maintains the delivery of the second braking value-signal value aS2' to control device (14) until ascertainment of a change in the operator signal (S). The control device (14) decreases the energy signal accordingly and thereby provides for the second braking value B2. As a result, as stated earlier, the hysteresis is skipped and the braking system is caused to respond immediately.

When the operator signal (S) drops further, the control unit (3) decreases the braking value signal, starting from the second braking value signal aS2', further and delivers it to control device (14). The control device (14) again decreases the energy signal accordingly and thereby provides for the corresponding braking value (B) according to characteristic line (W) for brake release.

There are instances of application under operating conditions which cause frequent fluctuation of the operator signal (S) between drop and resumed rise, for example, when a vehicle is on an uneven road. In such cases, the reaction of the braking system to every drop of the operator signal, no matter how minimal, may result in an irregular and undesirably nervous braking action. This generally also leads to a disadvantageous consumption of energy.

For such instances of application, the braking system can be further developed to even out the irregularity in such manner that the control unit (3) recognizes a drop of the operator signal (S) (triggering the computation of the second braking signal value aS2') only when the drop is equal to or exceeds a predetermined threshold value (SWL). This threshold value (SWL) may be of a constant magnitude over the entire operator signal range; but it may also vary as a function of the operator signal (S). In other words, the magnitude of threshold value (SWL) may depend on the magnitude of the operator signal (S). A threshold value course with the last-mentioned characteristic is indicated as broken line (R)

in FIG. 1. The difference along the x-axis between the desired-value characteristic line (T) and line (R) indicates the threshold value (SWL) associated with every operator signal (S).

In this further development, the equation $$SWL = SWLF \cdot S \tag{II}$$

is stored in the control unit (3) for determining the magnitude of the threshold value (SWL) for every operator signal (S). In this equation, SWLF is a threshold value factor. The latter may be between 0.002 and 0.1 for example, so that the threshold value which triggers control unit (3) to recognize a drop in operator signal (S) comes as a rule to 0.2% to 10% of the appertaining operator signal (S). To facilitate understanding, the line (R) is drawn in FIG. 1 so that the threshold value (SWL) appears disproportionately large.

If the control unit (3) in this further development ascertains a drop of the operator signal from S1 to S2 from one cycle to the next, it uses equation (II) to compute the value SWL1 as the threshold value associated with S1 and checks whether the second operator signal value has reached the value $S2 = S1 - SWL1 = S1 - SWLF \cdot S1 = S1(1 - SWF)$. If this is not the case, control unit (3) delivers the operator signal (S) as braking value signal (aS), or computes the braking value signal (aS) from the operator signal (S), and delivers it to control device (14). Since this decrease of the braking value signal does not overcome the hysteresis, it does not lead to a reaction of the braking system. Only when the control unit (3) ascertains from one cycle to the next that the second operator signal value S2 has dropped to the indicated value does it compute from equation (I) the second braking value signal value aS2', transmits the latter to the control device (14), and repeats the action until it ascertains a further drop of the operator signal (S) from one cycle to the next, with the result described above, that the second braking value B2 is produced. If the threshold value (SWL) is of a constant magnitude, this value is stored in the control unit (3) instead of the equation (II). In that case, the constant magnitude threshold value (SWL) is used in the further development of the braking system, i.e., of control unit (3), as described.

The effect achieved by introducing the threshold value (SWL) can be sensed by the operator as a low hysteresis. This impression, however, does not eliminate the overall improvement achieved by the invention.

The control unit (3) can also be developed further such that it omits application of the threshold value (SWL) in the range of high operator signal values.

The equation (I) given above contains a mathematical description of the hysteresis of the braking system as a person schooled in the art will understand. This hysteresis is based on analyses of one or ,several actual brakes. This hysteresis may be called "theoretical." The actual hysteresis occurring may deviate from this "theoretical hysteresis" for a variety of reasons. Such reasons may be operational, maintenance-related, or age-induced changes in the braking system, in particular in the brake, but also may be attributed to unavoidable quality variations during the manufacture of the components of the braking system, in particular of the brake (11, 12). The thermal condition of the brake (11, 12) should be mentioned especially among the influences due to operation.

If the actual hysteresis (as shown by broken line N in FIG. 2) is greater than the theoretical hysteresis, the second braking value signal value aS2' computed according to equation (I) determines a point aS2'/B2 located within the actual hysteresis field, and the braking system does not react or reacts only after a second drop of the operator signal (S). If, on the other hand, the actual hysteresis (as shown by broken line 0 in FIG. 2) is smaller than the theoretical hysteresis, the second braking signal value aS2' computed according to equation (I) produces a braking value B4 which is lower than the demanded second braking value B2. This phenomenon may have as its consequence that the improvements achieved by the invention are lost entirely or in part.

The braking system can therefore be further developed so that the control unit (3) adapts the second braking value signal value aS2' to the actual hysteresis.

For this purpose, a braking value sensor is provided and is connected to the control unit (3) or the contingently already present and drawn braking value sensor (13) is connected to control unit (3). Furthermore, the control unit (3) is designed to operate as follows: If the control unit (3) has computed the second braking value signal value aS2' due to a drop of the operator signal (S) to the second operator signal value S2 on the basis of equation (I) and has emitted it, the braking value sensor (13) measures the then-occurring actual braking value and transmits a corresponding signal to the control unit (3). The control unit (3) compares the actual braking value to the second braking value B2 which the operator demands according to the desired-value characteristic line (T) for the second operator signal value S2. If the control unit (3) ascertains that the actual braking value is less than the demanded second braking value B2, e.g., it is B4, then the actual hysteresis is less than the theoretical hysteresis. In this case, the control unit (3) increases the second braking value signal value aS2' computed according to equation (I) by a predetermined value. This may be accomplished if the control unit (3) adds a predetermined correction value to the right side of equation (I), or if it multiplies the right side or the element of the right side constituting the hysteresis by a predetermined correction factor (KF). In the lattercase, equation (I) becomes equation (Ia):

$$aS2' = aS2 - [aSA - aSR + (aSOV - aSOW - aSA + aSR) \cdot (aS2 - aSA)/(aSOV - aSA)] \cdot KF \tag{Ia}$$

where KF is less than 1.

If, on the other hand, the control unit (3) ascertains no drop in the actual braking value after output of the second braking value signal value aS2' computed according to equation (I), i.e., if the control unit (3) receives no corresponding signal from the braking value sensor (13), the actual hysteresis is greater than the theoretical one. In this case, the control unit (3) reduces the second braking value signal aS2' computed according to equation (I). This can be accomplished if the control unit (3) subtracts a predetermined correction value from the right side of to the equation (I) or if it sets the correction factor (KF) in equation (Ia) to be greater than 1.

If the control unit (3) ascertains for one or several cycles in a row that after the first correction of the second braking value signal aS2 there is no agreement between the actual braking value and the demanded second braking value B2, i.e., no adaptation has been achieved through a first correction of the second braking value signal aS2', control unit (3) repeats the correction until adaptation is achieved, where the term "adaptation" should be understood to take into account unavoidable tolerances.

If the actual hysteresis is smaller than the theoretical one, the control unit (3) can be designed to dimension the applied correction values or correction factors according to the magnitude of the deviation found between the actual braking value and the demanded second braking value B2.

For example, control unit (3) can start in the presence of a wide deviation with a correction factor KF=0.95 and decrease it in progressively smaller steps to a necessary final value, e.g., KF=0.85, while increasingly approaching the adapted state.

If the actual hysteresis is greater than the theoretical one, control unit (3) can apply a correction factor, e.g., KF=1.02, until the second braking value signal value aS2' corrected according to equation (Ia) has reached the limit of the hysteresis field.

In actual braking systems, because of the unavoidable response delays and the time required for a change in braking energy, the braking value (B) normally follows a change in the operator signal (S) with a time delay. It is therefore advantageous to design the control unit (3) so that it carries out the repetition of the described comparison and of the described correction only if it has not ascertained any drop of the operator signal (S) for several cycles. For the same reason, it is also advantageous to design the control unit (3) so that it carries out possibly necessary further repetitions again several cycles later. Such an approach is absolutely not noticeable to the operator in view of the high cycle frequency that is possible with conventional microprocessors.

The control unit (3) can furthermore be designed to store that equation (Ia) which has resulted in an adaptation as a basis for the computation of the second braking value aS2' for subsequent brake release processes until additional corrections may be needed.

The above-described further development of the invention for the adaptation of the second braking value signal value aS2' can be implemented in the basic design of the braking system which reacts to every drop of the operator signal (S), as well as in the development which reacts only after a drop of the operator signal (S) by the threshold value (SWL).

It shall now be assumed that the operator wishes to increase the braking value again, e.g., to a third braking value B3, after a partial brake release to the second braking value B2 or to a lower braking value, that is to say, the operator wishes to re-actuate the braking system. The operator then increases the actuator force and/or the actuator travel introduced into the braking value demand mechanism (1) so that the braking value demand mechanism (1) puts out the operator signal value S3 associated with a third braking value B3 according to the desired-value characteristic line (T) in FIG. 1. The control unit (3) jumps in that case from the output of the second braking signal value aS2', or a lower braking value signal, to the output of the third braking value signal value aS3 associated with the third operator signal value S3 according to characteristic line (V) for brake actuation (see FIG. 2), with the result that the energy dimensioning device (10, 14) changes the braking energy accordingly and the braking system increases its braking value output to the third braking value B3.

Following a drop of the operator signal, if the operator signal (S) increases again to a signal value S3 which demands a third braking value B3, the control unit (3) thus sets the braking value signal (aS), already based on the braking value signal value associated with the last operator signal according to characteristic line (W), to the braking value signal value aS3 associated with the third braking value B3 according to characteristic line (V).

As a result, the control unit (3) causes the braking system to behave according to characteristic line (T) in FIG. 1 also during re-actuation, thereby causing also in this case an impression of hysteresis-free braking to the operator.

This function of the control unit (3) is triggered when the control unit (3) ascertains a reversal from a dropping operator signal (S) to a rising operator signal (S) from one cycle to the next, or a rise of the operator signal from one cycle to the next following an earlier drop of the operator signal (S) which is then followed by a phase of identical operator signals over one or several cycles. Here it does not matter whether the control unit (3) have used equation (I) or equation (Ia) during the prior brake release.

For the same reasons, as mentioned further above in connection with brake release, the control unit (3) can be developed further so that it first recognizes a re-actuation of the brakes only when the rise in operator signal (S) is equal to or exceeds a predetermined threshold value (SWB), thereby prompting the computation of the third braking value signal value aS3. The threshold value (SWB) can also be of a constant magnitude over the entire operator signal range, or be a function of the operator signal (S). The course of a threshold value (SWB) which is a function of operator signal (S) is shown as the broken line (P) in FIG. 1.

In this, further development the equation $$SWB = SWBF \cdot S \qquad (III)$$

indicating the magnitude of the threshold value (SWB) for each operator signal (S) is additionally stored in a memory of control unit (3). In this equation, SWBF is again a threshold value factor. For it as well as for the threshold value (SWB) and line (P), that which was stated earlier in connection with the threshold value SWL during brake release applies correspondingly.

If in this case the control unit (3) ascertains a rise of the operator signal (S) from one cycle to the next, e.g., from the second operator value S2 to the third operator signal value S3, it computes from equation (III) the value SWB2 of threshold value (SWB) associated with S2 and checks whether the third operator signal value has reached the value $S3 = S2 + SWB2 = S2 + SWBF \cdot S2 = S2(1 + SWBF)$. If this is not the case, control unit (3) emits the operator signal (S) as a braking value signal (aS) or computes from the operator signal (S) the braking value signal (aS) and emits the latter. Since the latter does not overcome the hysteresis, this does not cause any reaction in the braking system as a consequence. Only when the control unit (3) ascertains in a cycle that the third operator signal value S3 has reached the indicated value does it jump over to the output of the third braking value signal value aS3 with the earlier-mentioned result that the braking value output is increased to the third braking value B3.

The brake (11, 12) mentioned thus far can represent several brakes. Every brake in the system can be assigned its own energy supply (8), its own energy distributor (7), and its own channel (not shown) in the control device (14) as shown schematically for the brake (5, 6) in FIG. 4.

It is also customary to assign the same energy supply to several brakes. In such case, a common energy distributor can be assigned to all the brakes associated with one energy supply; but it is also possible to assign each brake its own energy distributor.

Braking systems with several brakes together with their associated components are used in many technical areas, e.g., in vehicle technology. If the shown braking system serves as a vehicle braking system, it is customary that each of the brakes shown (5, 6 or 11, 12) stands for several brakes on a vehicle axle.

It is also customary, especially in vehicle technology, to have the control device (14) vary the braking value share attributed to each brake or to the brakes on each axle according to additional parameters. Such a possibility is indicated by an additional sensor (4) shown in FIG. 4 which is connected to the control device (14). The sensor (4) could, for instance, be a vehicle weight sensor, an axle load sensor, a brake torque sensor of a dynamic brake, a temperature sensor, or a sensor for other common parameters. It is also possible to provide several sensors with the signals from these sensors influencing the braking value produced by the braking system or the share of the braking value allocated to individual brakes.

Finally, it should be pointed out that the scope of protection of the instant invention is not limited to the embodiment given as an example together with the mentioned further developments, but comprises all embodiments whose characteristics fall under the claims.

I claim:

1. Braking system comprising
    at least one actuable and releasable brake,
    a brake value demand mechanism which emits an operator signal when activated by an operator,
    a controller which receives said operator signal from said brake value demand mechanism and which emits a braking value signal which depends on said operator signal, and
    an energy dimensioning device which receives said braking value signal and which supplies braking energy based thereon to said brake to actuate said brake and thereby produce a braking force at said brake, said braking system producing a braking value which is at least co-determined by said braking force,
    wherein due to brake hysteresis, said braking system follows a first characteristic line of the braking value as a function of the braking value signal when said brake is actuated and a second characteristic line of the braking value as a function of the braking value signal when said brake is released, and
    wherein said braking value signal emitted by said controller is equal to a first braking value signal corresponding to a first desired braking value from said first characteristic line when said brake is actuated, and said braking value signal emitted by said controller is equal to a second braking value corresponding to a second desired braking value from said second characteristic line when said brake is released, said braking system thereby following a desired-value characteristic line of the braking value signal as a function of the operator signal.

2. The braking system of claim 1 wherein said controller emits said first braking value signal (aS1) associated with said first braking value (B1) from said first characteristic line upon receiving a first operator signal value (S1), and emits said second braking value signal (aS2') associated with said second braking value (B2) from said second characteristic line when said first operator signal value (S1) drops to a second operator signal value (s2).

3. The braking system of claim 2 wherein said controller emits said second braking value signal (aS2') only after said operator signal drops by a predetermined threshold value.

4. The braking system of claim 3 wherein said predetermined threshold value is of constant magnitude.

5. The braking system of claim 3 wherein said predetermined threshold value varies as a function of the value of said operator signal.

6. The braking system of claim 2 wherein said controller emits a third braking value signal (aS3) associated with a third braking value (B3) from said first characteristic line for brake actuation when said second operator signal value (S2) rises to a third operator signal value (S3) from said second operator signal value (s2).

7. The braking system of claim 6 wherein said controller emits said third braking value signal (aS3) only after said operator signal rises from said second operator signal value (S2) by a predetermined threshold value.

8. The braking system of claim 7 wherein said predetermined threshold value is of constant magnitude.

9. The braking system of claim 7 wherein said predetermined threshold value varies as a function of the value of said operator signal.

10. The braking system of claim 2 further comprising a braking value sensor which measures an actual braking value and transmits an actual braking value signal to said controller based on said measurement, wherein said controller compares said actual braking value measured by said sensor with said second braking value (B2) in accordance with said desired-value characteristic line when said operator signal drops to said second operator signal value (S2), and said controller corrects said second braking value signal (aS2) if a difference is found.

11. A method of actuating a brake so as to produce a desired braking value of a braking system, comprising
    producing an operator signal,
    determining whether said operator signal is rising or dropping,
    producing a braking value signal based at least in part on said operator signal, and
    supplying said brake with braking energy based on said braking value signal,
    wherein said braking value signal produced is in accordance with a first characteristic line of the braking value as a function of the braking value signal for brake actuation when said operator signal is rising, and said braking value signal produced is in accordance with a second characteristic line of the braking value as a function of the braking value signal for brake release when said operator signal is dropping.

12. The method of claim 11 wherein said braking value signal is produced in accordance with said first characteristic line when said operator signal is rising, and said braking value signal is thereafter produced in accordance with said second characteristic line only if said operator signal drops by a predetermined threshold value.

13. The method of claim 12 wherein said predetermined threshold value is of constant magnitude.

14. The method of claim 12 wherein said predetermined threshold value varies as a function of the value of said operator signal.

15. The method of claim 11 where said braking value signal is produced in accordance with said second characteristic line when said operator signal is dropping, and said braking value signal is thereafter produced in accordance with said first characteristic line only if said operator signal rises by a predetermined threshold value.

16. The method of claim 15 wherein said predetermined threshold value is of constant magnitude.

17. The method of claim 15 wherein said predetermined threshold value varies as a function of the value of said operator signal.

18. The method of claim 11 further comprising measuring an actual braking value produced by said braking system, and adjusting said operator signal so that said actual braking value will be equal to said desired braking value.

19. Braking system from which a desired-value characteristic line (T) of a braking value (B) as a function of an operator signal (S) is demanded, the braking system comprising at least one actuable and releasable brake (11, 12), a brake value demand mechanism (1) which emits said operator signal (S) when activated by an operator, a controller (3) which receives said operator signal (S) from said brake value demand mechanism (1) and emits a braking value signal (aS) which depends on said operator signal (S), and an energy dimensioning device (10, 14) which receives said braking value signal (aS) and which supplies braking energy based thereon to said brake (11, 12) to actuate said brake (11, 12) and thereby produce a braking force (K) at said brake (11, 12), said braking system thereupon producing said braking value (B) which is at least co-determined by said braking force (K), wherein due to brake hysteresis, said braking system follows a first characteristic line (V) of the braking value (B) as a function of the braking value signal (aS) when said brake (11, 12) is actuated and a second characteristic line (W) of the braking value (B) as a function of the braking value signal (aS) when said brake (11, 12) is released, and wherein said controller (3), upon a drop of the operator signal (S) from a first operator signal value (S1) which is associated with a first brake value (B1) in accordance with said desired-value characteristic line (T) to a second operator signal value (S2) which is associated with a second brake value (B2) in accordance with said desired-value characteristic line (T), adjusts a first brake value signal (aS1) which is associated with the first brake value (B1) in accordance with said first characteristic line (V) to a second brake value signal (aS2') which is associated with said second brake value (B2) in accordance with said second characteristic line (W).

20. The braking system of claim 19 wherein said controller (3) emits said second braking value signal (aS2') only after said operator signal (S) drops by a predetermined threshold value.

21. The braking system of claim 20 wherein said predetermined threshold value varies as a function of the value of said operator signal (S).

22. The braking system of claim 19 wherein said controller (3) emits a third braking value signal (aS3) associated with a third braking value (B3) from said first characteristic line (V) when said second operator signal value (S2) rises to a third operator signal value (S3) from said second operator signal (S2).

23. The braking system of claim 22 wherein said controller (3) emits a third braking value signal (aS3) only after said operator signal (S) rises from said second operator signal value (S2) by a predetermined threshold value.

24. The braking system of claim 23 wherein said predetermined threshold value is of constant magnitude.

25. The braking system of claim 23 wherein said predetermined threshold value varies as a function of the value of said operator signal (S).

26. The braking system of claim 19 further comprising a braking value sensor which measures an actual braking value and transmits an actual braking value signal to said controller (3) based on said measurement, wherein said controller (3) compares said actual braking value measured by said sensor with said second braking value (B2) in accordance with said desired-value characteristic line (T) when said operator signal (S) drops to said second operator signal value (S2), and said controller (3) corrects said second braking value signal (aS2) if a difference is found.

27. A method for actuating a brake of a braking system so as to follow a desired-value characteristic line (T) of a braking value (B) as a function of a demanded operator signal (S), comprising producing said operator signal (S), emitting a braking value signal (aS) which depends on said operator signal (S), supplying braking energy based on said braking value signal (aS) to said brake of said braking system to actuate said brake and thereby produce a braking force (K) at said brake, said braking system thereupon producing said braking value (B) which is at least co-determined by said braking force (K), wherein due to brake hysteresis, said braking system follows a first characteristic line (V) of the braking value (B) as a function of the braking value signal (aS) when said brake is actuated and a second characteristic line (W) of the braking value (B) as a function of the braking value signal (aS) when said brake is released, and wherein in emitting said braking value signal (aS), upon a drop of the operator signal (S) from a first operator signal value (S1) which is associated with a first brake value (B1) in accordance with said desired-value characteristic line (T) to a second operator signal value (S2) which is associated with a second brake value (B2) in accordance with said desired-value characteristic line (T), a first brake value signal (aS1) which is associated with the first brake value (B1) in accordance with said first characteristic line (V) is adjusted to a second brake value signal (aS2') which is associated with said second brake value (B2) in accordance with said second characteristic line (W).

* * * * *